J. M. Harper,
Harrow.

No. 110,133. Patented Dec. 13, 1870.

Witnesses.
Chas. Kenyon.
Edwd P. Mase.

Inventor:
J. M. Harper,
Chipman & Fosnurt & Co,
Attorneys;

United States Patent Office.

JAMES M. HARPER, OF EL PASO, ILLINOIS.

Letters Patent No. 110,133, dated December 13, 1870.

IMPROVEMENT IN HARROWS.

The Schedule referred to in these Letters Patent and making part of the same.

*To all whom it may concern:*

Be it known that I, JAMES M. HARPER, of El Paso, in the county of Woodford and State of Illinois, have invented a new and valuable Improvement in Harrows; and I do hereby declare that the following is a full, clear, and exact description of the construction and operation of the same, reference being had to the annexed drawing making a part of this specification, and to the letters and figures of reference marked thereon.

Figure 1 of the drawing is my harrow in plan view.

Figure 1:
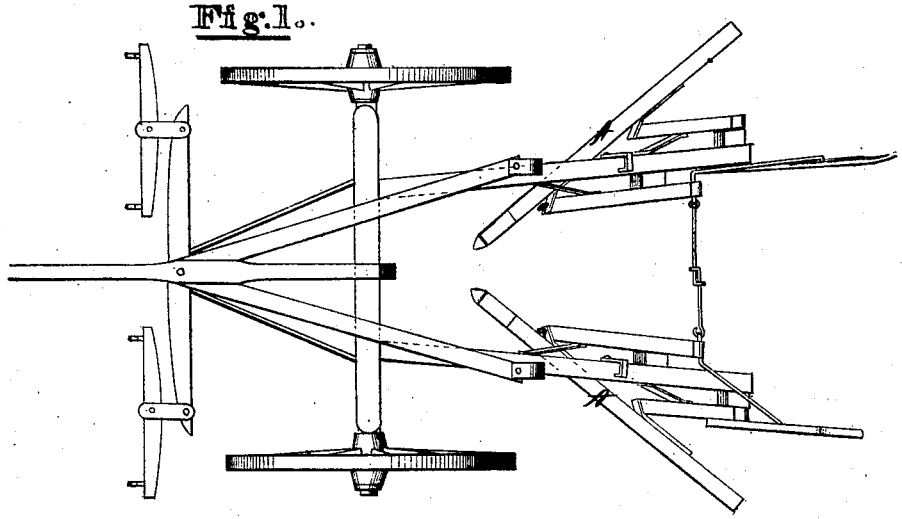
Figure 2:
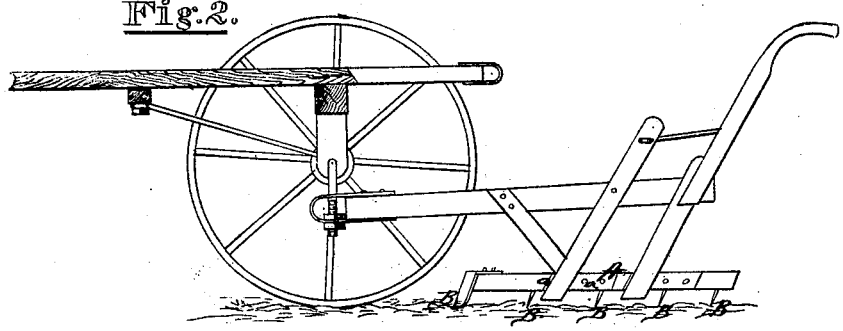
Figure 2 is a longitudinal vertical section of the same.
Figure 3:
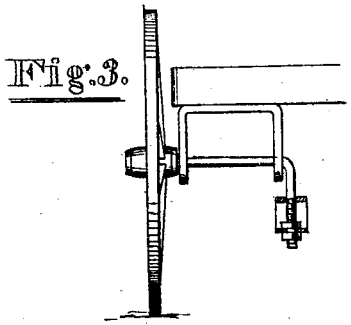
Figure 3 shows the mode of attaching the wheel and axle.

The nature of my invention consists in the construction and arrangement of a "harrow," or rather "harrow attachment," to be used in connection with or on any cultivator, but more particularly the cultivator patented by Samuel H. Mitchell, December 1, 1863.

In order to enable others skilled in the art to which my invention appertains to make and use the same, I will now proceed to describe its construction and operation.

In the annexed drawing I have represented my harrow as attached to the cultivator of S. H. Mitchell, above referred to, said cultivator requiring no description here, as it is so well known as the "Corn-Dodger Cultivator."

A represents a beam of wood or iron, provided with teeth or small shovels B B, which are driven through or bolted on the beam, or fastened in any other convenient manner.

On the side of the beam A are metal bars $a$ $a$, which hook over the front of the cultivator-shanks, and are fastened to the same by any suitable means.

The harrow A B, thus constructed, can be attached to either side of the cultivator-shanks, or the end of the same can be attached to seat of front shank, and have a shovel on said shank. A beam can be attached between the shanks, and have a shovel on each.

The harrow thus attached can be adjusted to any width or depth desired. One side can be raised while ths other is in motion.

A harrow may in this manner be attached to any cultivator-shanks or posts to which cultivator-shovels are attached.

The bars or fastenings $a$ $a$ may be made with a slot in the part which fits onto the harrow-beam, so that the same can be adjusted to fit cultivator-shanks that are different distances apart.

Having thus fully described my invention,

What I claim as new, and desire to secure by Letters Patent, is—

In a wheeled straddle-row cultivator, the harrow attachment herein described, when constructed with a front shovel-plow, B, and side metal bars or plates $a$ $a$, substantially as and for the purpose specified.

In testimony that I claim the above, I have hereunto subscribed my name in the presence of two witnesses.

JAMES M. HARPER.

Witnesses:
GEO. PUTERBAUGH,
N. E. WORTHINGTON.